US008128395B2

(12) United States Patent
Shindo et al.

(10) Patent No.: US 8,128,395 B2
(45) Date of Patent: Mar. 6, 2012

(54) HONEYCOMB SEGMENT-FORMING DIE AND METHOD FOR MANUFACTURING HONEYCOMB STRUCTURE

(75) Inventors: Hiroyuki Shindo, Nagoya (JP); Tomoki Nagae, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 64 days.

(21) Appl. No.: 12/617,408

(22) Filed: Nov. 12, 2009

(65) Prior Publication Data

US 2010/0116427 A1 May 13, 2010

Related U.S. Application Data

(63) Continuation of application No. PCT/JP2008/058618, filed on May 9, 2008.

(30) Foreign Application Priority Data

May 18, 2007 (JP) ................................. 2007-132629

(51) Int. Cl.
*B29C 47/12* (2006.01)
(52) U.S. Cl. ..................... 425/380; 264/177.12; 425/467
(58) Field of Classification Search ............. 264/177.12, 264/630; 425/380, 467
See application file for complete search history.

(56) References Cited

U.S. PATENT DOCUMENTS

| 4,349,329 | A | * | 9/1982 | Naito et al. .................... 425/461 |
| 4,362,495 | A | * | 12/1982 | Naito et al. .................... 425/380 |
| 4,368,025 | A | * | 1/1983 | Naito et al. .................... 425/462 |
| 5,952,079 | A | | 9/1999 | Andou et al. |
| 2004/0142145 | A1 | | 7/2004 | Hashimoto et al. |
| 2004/0161583 | A1 | | 8/2004 | Brew et al. |
| 2005/0147707 | A1 | * | 7/2005 | Nate et al. ...................... 425/380 |
| 2006/0103058 | A1 | | 5/2006 | Wada et al. |
| 2007/0169451 | A1 | | 7/2007 | Bardon et al. |

FOREIGN PATENT DOCUMENTS

| EP | 0 241 269 A2 | 10/1987 |
| FR | 2 864 575 A1 | 7/2005 |
| JP | A-2003-10616 | 1/2003 |
| JP | A-2003-181527 | 7/2003 |
| JP | A-2006-142579 | 6/2006 |

OTHER PUBLICATIONS

International Search Report for International Application No. PCT/JP2008/058618, pp. 1-2, mailed on Jul. 22, 2008, ISA: Japanese Patent Office.
Dec. 1, 2011 Extended European Search Report in European Patent Application No. 08 75 2504,4.

* cited by examiner

*Primary Examiner* — Joseph Del Sole
*Assistant Examiner* — Joseph Leyson
(74) *Attorney, Agent, or Firm* — Oliff & Berridge, PLC

(57) ABSTRACT

A honeycomb segment-forming die includes: an introducing portion provided on an introduction face side and having a plurality of back holes, and a forming portion provided on an formation face side and having slits communicating with the back holes. The forming portion has a polygonal outer peripheral shape and forms a prismatic honeycomb segment by passing kneaded clay for forming which is introduced from the back holes of the introducing portion through the slits of the forming portion, and a gap between slits formed in each of corner portions including a vertex of the polygonal forming portion is larger than a gap of slits formed in the central portion of the forming portion. This enables to form a honeycomb segment having high compressive strength.

7 Claims, 12 Drawing Sheets

FIG.8
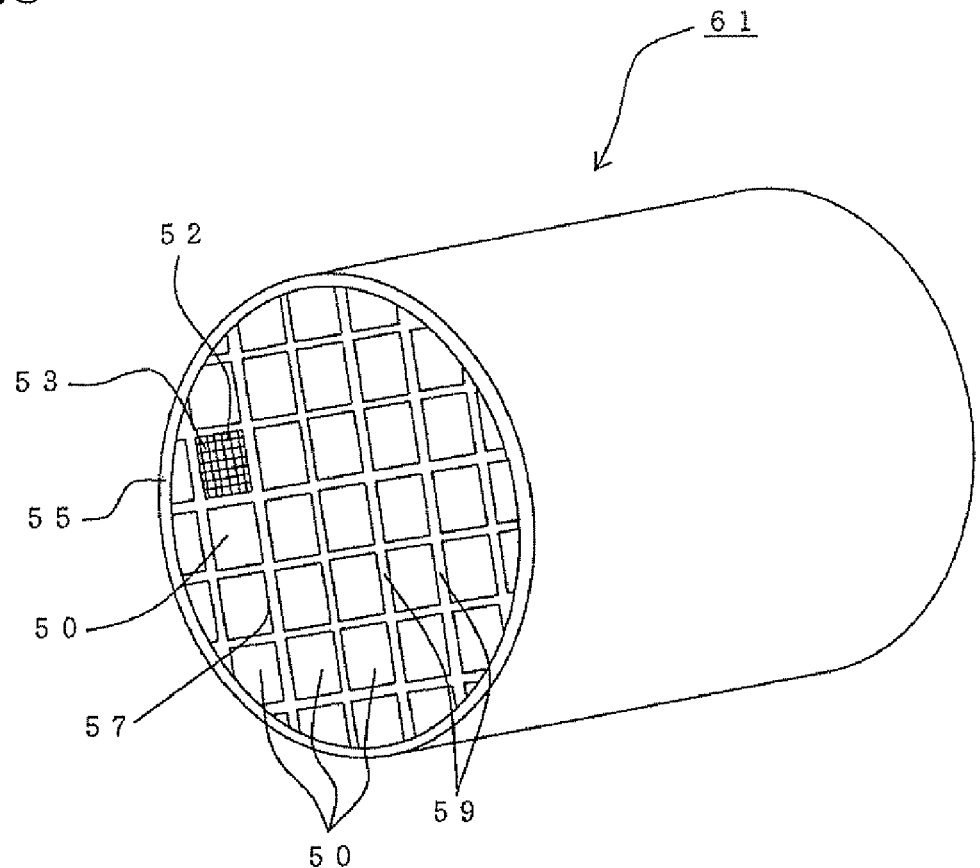
FIG.9  EXAMPLE 5: ROW ON THE OUTERMOST PERIPHERAL SIDE
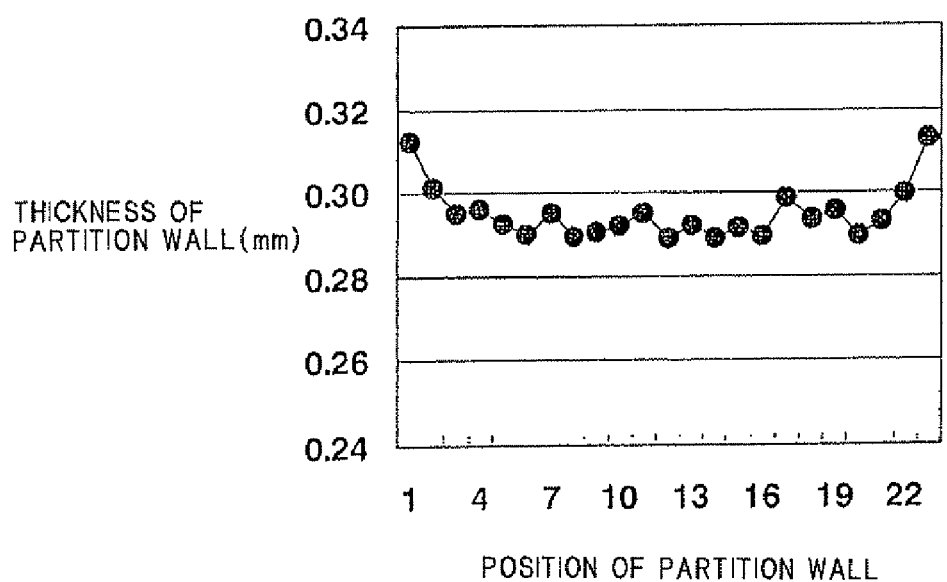

US 8,128,395 B2

HONEYCOMB SEGMENT-FORMING DIE AND METHOD FOR MANUFACTURING HONEYCOMB STRUCTURE

This is a Continuation of International Application No. PCT/JP2008/058618 filed May 9, 2008, which claims the benefit of Japanese Application No. 2007-132629 filed May 18, 2007. The disclosure of the prior application is hereby incorporated by reference herein in its entirety.

TECHNICAL FIELD

The present invention relates to a honeycomb segment-forming die and a method for manufacturing a honeycomb structure. More specifically, the present invention relates to a honeycomb segment-forming die capable of forming a honeycomb segment having high compressive strength and to a method for manufacturing a honeycomb structure, the method using such a honeycomb segment-forming die.

BACKGROUND ART

For environmental improvement, pollution prevention, and the like, a honeycomb structure is frequently used as a trapping filter for exhaust gas. At present, for example, a SiC DPF (diesel particulate filter) is manufactured by unitarily bonding divided substrate (honeycomb segment) with a bonding material (e.g., ceramic cement) in order to avoid cracking due to thermal shock (see, e.g., Patent Document 1).

In the case of manufacturing such a honeycomb segment, there has been used a honeycomb segment-forming die provided with an introducing portion arranged on one face (introduction face) side and having a plurality of back holes and a forming portion arranged on the other face (formation face) side and having slits communicating with the back holes to form a honeycomb segment by passing kneaded clay for forming introduced from the back holes of the introducing portion through the slits in the forming portion.

As described above, since honeycomb segments are used by being unitarily joined with one another with a bonding material, each honeycomb segment is generally formed to have a prismatic shape (e.g., quadrangular prismatic shape and hexagonal prismatic shape). Therefore, a honeycomb segment-forming die for forming a honeycomb segment is constituted in such a manner that the forming portion has a polygonal outer peripheral shape. In addition, such a honeycomb segment-forming die is generally constituted in such a manner that the gaps of slits in the forming portion are uniform.

Patent Document 1: JP-A-2003-10616

DISCLOSURE OF THE INVENTION

However, when the honeycomb segment is formed by the use of such a conventional honeycomb segment-forming die, there is caused a difference in thickness between partition walls on the outer peripheral side of the honeycomb segment to be obtained and partition walls in the central portion. In particular, regarding the portion corresponding to each corner including each vertex of the prismatic honeycomb segment, partition walls become particularly thin to decrease mechanical strength, in particular, compressive strength of the honeycomb segment, and therefore there arises a problem of inducing chipping, cracking, or the like, in handling.

The present invention has been made to solve such a problem of prior art and provides a honeycomb segment-forming die capable of forming a honeycomb segment having high compressive strength and a method for manufacturing a honeycomb structure using such a honeycomb segment-forming die.

The present inventors keenly investigated to achieve the above aim and, as a result, found out that the above aim can be achieved by setting the gap of slits formed in each of corner portions including a vertex of the polygonal forming portion larger than the gap of slits formed in the central portion of the forming portion, which led to the completion of the present invention.

That is, according to the present invention, there is provided the following honeycomb segment-forming die and method for manufacturing a honeycomb structure using such a honeycomb segment-forming die.

[1] A honeycomb segment-forming die provided with: an introducing portion arranged on one face (introduction face) side and having a plurality of back holes, and a forming portion arranged on the other face (formation face) side and having slits communicating with the back holes; wherein the forming portion has a polygonal outer peripheral shape and forms a prismatic honeycomb segment by passing kneaded clay for forming which is introduced from the back holes of the introducing portion through the slits of the forming portion, and a gap of slits formed in each of corner portions including a vertex of the polygonal forming portion is larger than a gap of slits formed in the central portion of the forming portion.

[2] A honeycomb segment-forming die according to the above [1], wherein the gap of the slits formed in the corner portions of the forming portion is 1.03 to 1.20 times larger than the gap of slits formed in the central portion.

[3] A honeycomb segment-forming die according to the above [1] or [2], wherein each of the corner portions is constituted by the region where a slit corresponding with one to five rows with a slit on the vertex side of the forming portion as a starting point is formed.

[4] A honeycomb segment-forming die according to any one of the above [1] to [3], wherein the gap of the slits formed in an outer peripheral portion of the forming portion except for the corner portions is larger than the gap of the slits formed in the central portion of the forming portion and smaller than the gap of the slits formed in the corner portions.

[5] A method for manufacturing a honeycomb structure comprising: a step of obtaining a prismatic honeycomb segment formed body by introducing kneaded clay for forming from the back holes of the introducing portion of the honeycomb segment-forming die according to any one of the above [1] to [4] and extrusion-forming the kneaded clay for forming through the slits of the forming portion, a step of obtaining a honeycomb segment with porous partition walls separating and forming a plurality of cells functioning as fluid passages and a porous outer wall disposed in the outer periphery of the partition walls by drying and firing the honeycomb segment formed body, and a step of manufacturing a honeycomb structure by unitarily joining a plurality of honeycomb segments by bonding the outer walls with a bonding material.

Since, the gap of slits in the corner portion of the forming portion is larger than the gap of slits in the central portion of the forming portion in a honeycomb segment-forming die of the present invention, the thickness of the partition walls extrusion-formed in the corner portion, where the flow passage resistance is high to make the forming raw material (kneaded clay for forming) hardly flow, is equivalent to or larger than the thickness of the partition walls extrusion-formed in the central portion, and therefore a honeycomb segment having high mechanical strength, in particular, high compressive strength and hardly having chipping, cracking, or the like can be formed.

In addition, in a method for manufacturing a honeycomb structure of the present invention, a honeycomb structure is manufactured by bonding a plurality of honeycomb segments obtained by the use of the aforementioned honeycomb segment-forming die of the present invention, and therefore handling of the honeycomb segments is easy, and production yield can be improved.

BRIEF DESCRIPTION OF THE DRAWINGS

FIG. 8 is a perspective view showing an example of a honeycomb structure manufactured by a method for manufacturing a honeycomb structure of the present invention.

FIG. 9 is a graph showing a relation between a position of a partition wall and thickness of the partition wall in the B-axial direction of a honeycomb segment manufactured in Example 5.

Figure 1:
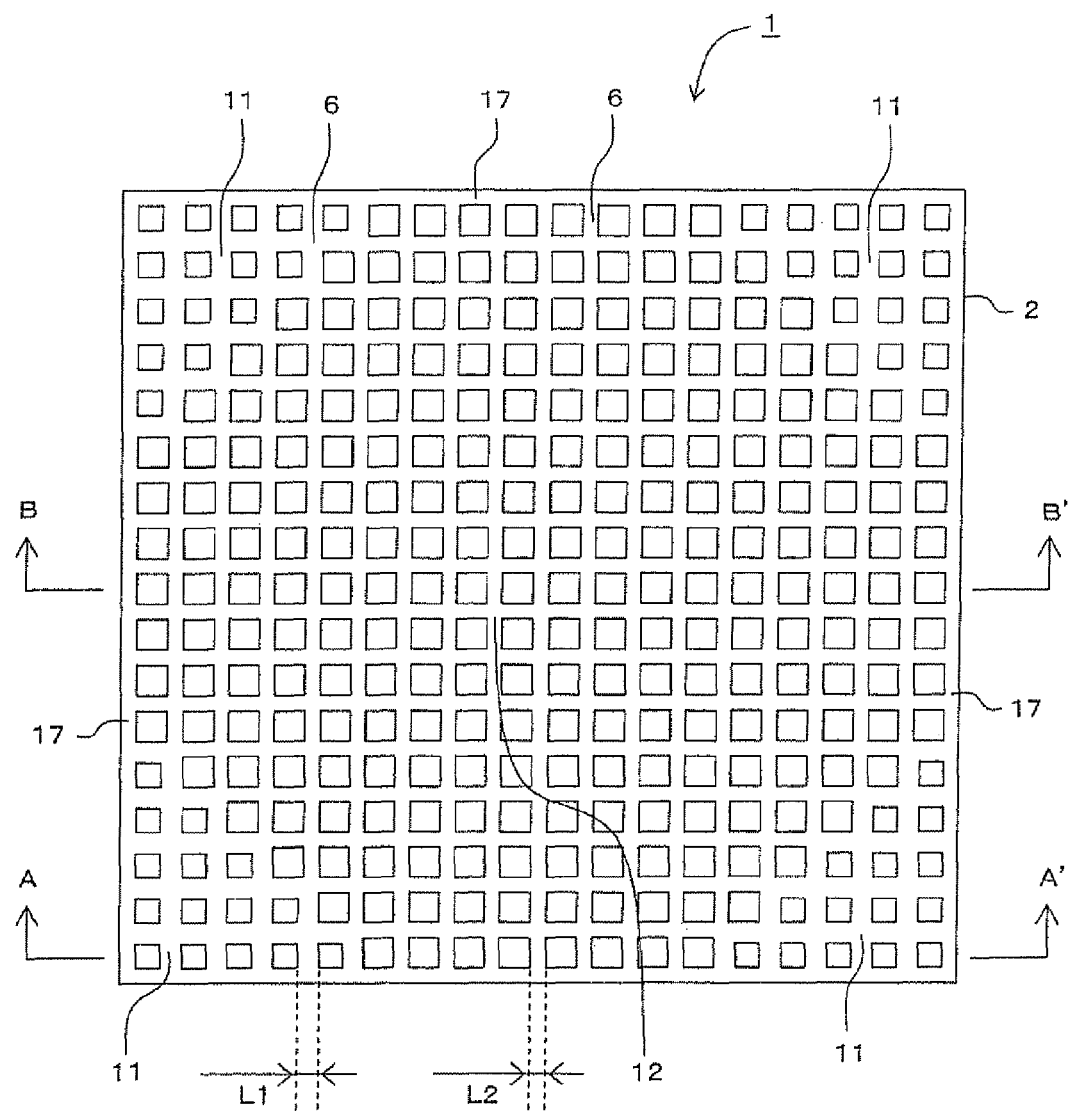
FIG. 1 is a plan view on the forming portion side in one embodiment of a honeycomb segment-forming die of the present invention.

DESCRIPTION OF REFERENCE NUMERALS 1, 1a, 1b: honeycomb segment-forming die, 2: forming portion, 3: introducing portion, 4: forming face, 6: slit, 7: back hole, 8: introduction face, 11: corner portion, 12: central portion, 13: outer peripheral portion, 17: outer wall-forming portion, 50: honeycomb segment, 52, 52a, 52b: partition wall, 53: cell, 55: coating material, 57: outer wall, 59: bonding material layer, 61: honeycomb structure, L1: gap of slits (gap of slits formed in corner portion), L2: gap of slits (gap of slits formed in the central portion), L3: gap of slits (gap of slits formed in outer peripheral portion)

BEST MODE FOR CARRYING OUT THE INVENTION

Hereinbelow, embodiments of a honeycomb segment-forming die and a method for manufacturing a honeycomb structure of the present invention will be described in detail, However, the present invention should not be construed with limiting to these embodiments, and various changes, modifications, and improvements may be added thereto on the basis of knowledge of a person of ordinary skill as long as they do not deviate from the scope of the present invention.

[1] Honeycomb Segment-Forming Die:

In the first place, an embodiment of a honeycomb segment-forming die of the present invention will specifically be described. FIG. 1 is a plan view on the forming portion side in one embodiment of a honeycomb segment-forming die of the present invention, FIG. 2 is a schematic cross-sectional view showing a cross section cut along the A-A' line in the honeycomb segment-forming die shown in FIG. 1, and FIG. 3 is a schematic cross-sectional view showing a cross section cut along the B-B' line in the honeycomb segment-forming die shown in FIG. 1.

Figure 2:
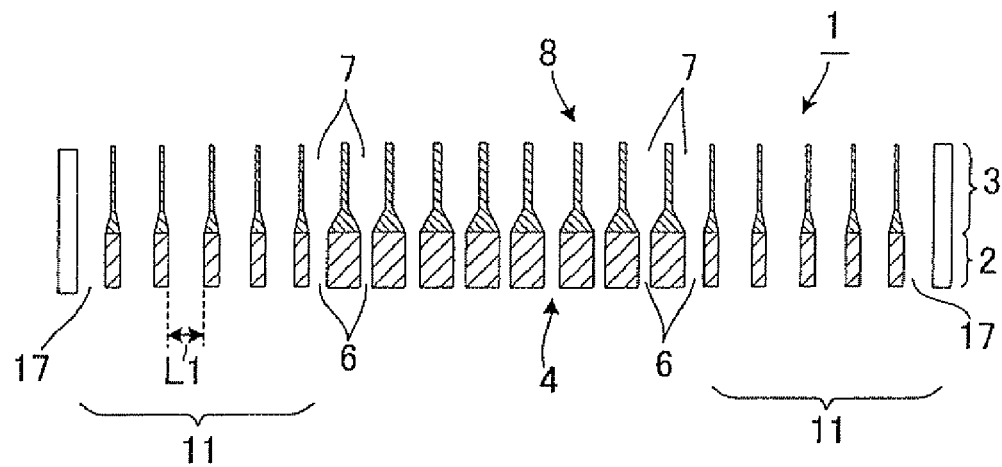
FIG. 2 is a schematic cross-sectional view showing a cross section cut along the A-A' line in the honeycomb segment-forming die shown in FIG. 1.
Figure 3:
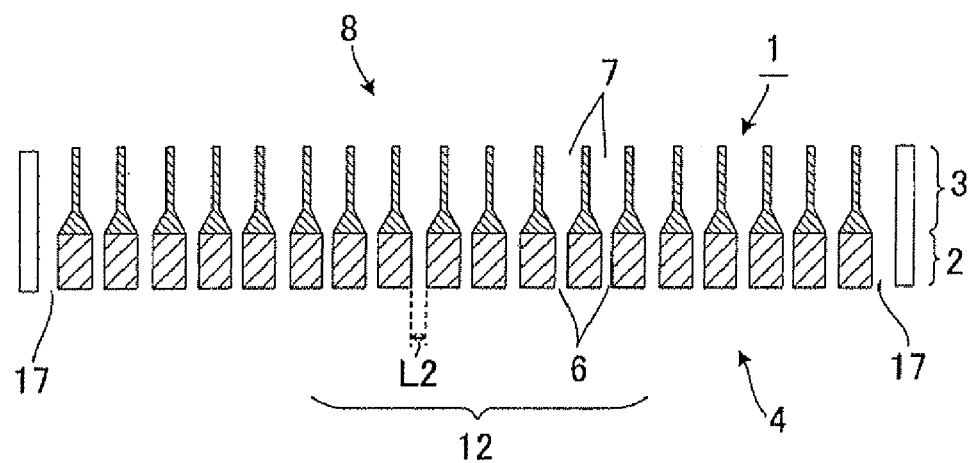
FIG. 3 is a schematic cross-sectional view showing a cross section cut along the B-B' line in the honeycomb segment-forming die shown in FIG. 1.

As shown in FIGS. 1 to 3, a honeycomb segment-forming die 1 of the present embodiment is provided with an introducing portion 3 arranged on one face (introduction face 8) side and having a plurality of back holes 7 and a forming portion 2 arranged on the other face (formation face 4) side and having slits 6 communicating with the back holes 7; wherein the forming portion 2 has a polygonal outer peripheral shape and forms a prismatic honeycomb segment by passing kneaded clay for forming (also referred to as forming raw material) which is introduced from the back holes 7 of the introducing portion 3 through the slits 6 of the forming portion 2, and a gap L1 between slits 6 formed in each of the corner portions 11 including a vertex of the polygonal forming portion 2 is larger than a gap L2 of slits 6 formed in the central portion 12 of the forming portion 2. Incidentally, FIG. 1 shows a case that the forming portion 2 has a quadrangular outer peripheral shape.

Figure 4:
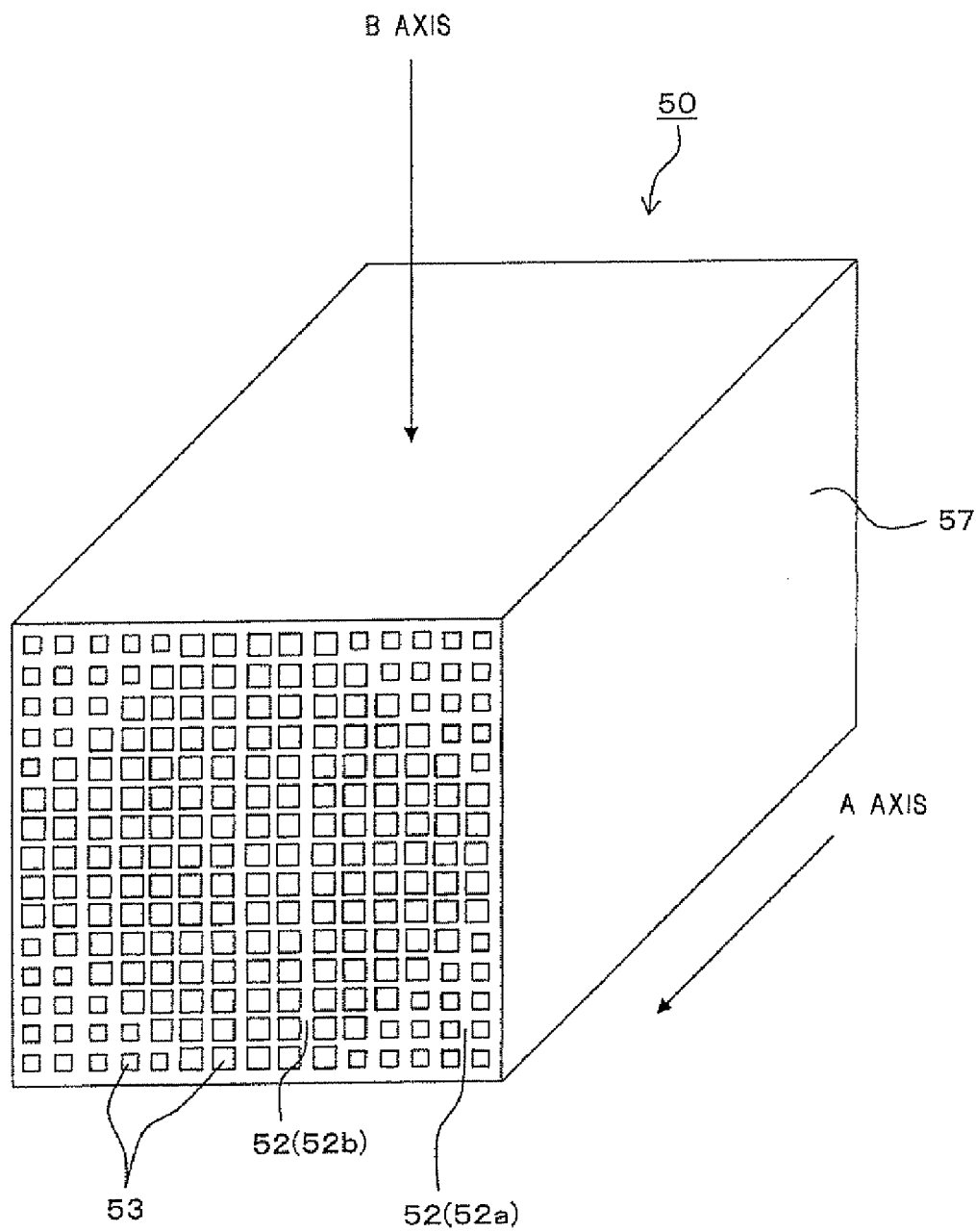
FIG. 4 is a perspective view showing an example of a honeycomb segment formed by using one embodiment of a honeycomb segment-forming die of the present invention.

According to a honeycomb segment-forming die 1 of the present embodiment, there can be formed a honeycomb segment 50 provided with porous partition walls 52 separating and forming a plurality of cells 53 functioning as fluid passages and a porous outer wall 57 disposed in the outer periphery of the partition walls 52 as shown in FIG. 4 by passing kneaded clay introduced from the back holes 7 of the introducing portion 3 through the slits 6 of the forming portion 2. Here, FIG. 4 is a perspective view showing an example of a honeycomb segment formed by the use of a honeycomb segment-forming die of the present embodiment. A honeycomb segment-forming die of the present embodiment can suitably be used as a die for forming a honeycomb segment used as a substrate for a porous-structured honeycomb structure of a Si—SiC sintered body using a material containing silicon carbide and metal silicon as the main components. A honeycomb structure obtained by bonding a plurality of such honeycomb segments of Si—SiC bodies is excellent in thermal shock resistance and can suitably be used as a trapping filter for exhaust gas, in particular, a diesel particulate filter (DPF) for trapping particulate matter (particulates) and the like in exhaust gas from a diesel engine.

As shown in FIGS. 1 to 3, it is preferable that the slits 6 of a honeycomb segment-forming die 1 of the present embodiment are formed in a lattice pattern in a face perpendicular to the flow direction of the kneaded clay for forming and that the back holes 7 are arranged so as to correspond with the positions where the slits 6 in a lattice pattern or the like cross. Incidentally, the slits 6 may be arranged so as to extend from the forming portion 2 to a part of the introducing portion 3 to form the back holes 7 so as to communicate with the slits 6. Conversely, the back holes 7 may be arranged so as to extend from the introducing portion 3 to a part of the forming portion 2 to form the slits 6 so as to communicate with the back holes 7. Incidentally, in the honeycomb segment-forming die 1 shown in FIGS. 1 to 3, the gap in the outermost peripheral portion of the forming portion 2 shows the outer wall-forming portion 17 for forming the outer wall 57 (see FIG. 4) of the honeycomb segment 50 (see FIG. 4).

As described above, in a honeycomb segment-forming die 1 of the present embodiment, since the gap L1 between the slits 6 formed in each of the corner portions 11 including each vertex of the polygonal forming portion 2 is larger than the gap L2 between the slits 6 formed in the central portion 12 of the forming portion 2, the thickness of the partition walls 52a (see FIG. 4) of the honeycomb segment 50 (see FIG. 4) extrusion-formed in the corner portion 11, where the flow passage resistance is high to make the kneaded clay for forming hardly flow, can be made equivalent to or larger than the thickness of the partition walls 52b (see FIG. 4) extrusion-formed in the central portion 12, and therefore a honeycomb segment 50 (see FIG. 4) having high mechanical strength, particularly, high compressive strength and hardly having chipping, cracking, or the like can be formed. The honeycomb segment-forming die 1 shown in FIGS. 1 to 3 is formed in such a manner that the gap of all the slits 6 in the forming portion 2 except for the corner portion 11 is the same.

Incidentally, FIG. 4 shows a honeycomb segment 50 where the thickness of the partition walls 52a formed in the four corner portions of the honeycomb segment 50 is formed to be larger than the thickness of the partition walls 52b formed in the central portion. However, a honeycomb segment 50 extrusion-formed by the use of a honeycomb segment-forming die of the present embodiment is not always thus formed. That is, in a conventional honeycomb segment-forming die, the flow passage resistance is high in the corner portions, and kneaded clay for forming hardly flows there. A honeycomb segment-forming die of the present embodiment is a die aiming to form a honeycomb segment having high strength, particularly, compressive strength and hardly having chipping, cracking, or the like by making the gap of the slits in the corner portions relatively large to increase an introduced amount of kneaded clay for forming into the corner portions in order to increase thickness of the partition walls in the corner portions, where the thickness was extremely small in forming in a conventional manner.

Therefore, even if a honeycomb segment-forming die of the present embodiment is used, there are some cases that, for example the thickness of the partition walls formed in the four corner portions of the honeycomb segment and the thickness of the partition walls formed in the central portion is about the same depending on the kind or the conditions of kneaded clay for forming or the outer diameter, length, or the like of the honeycomb segment to be extrusion-formed.

Figure 5:
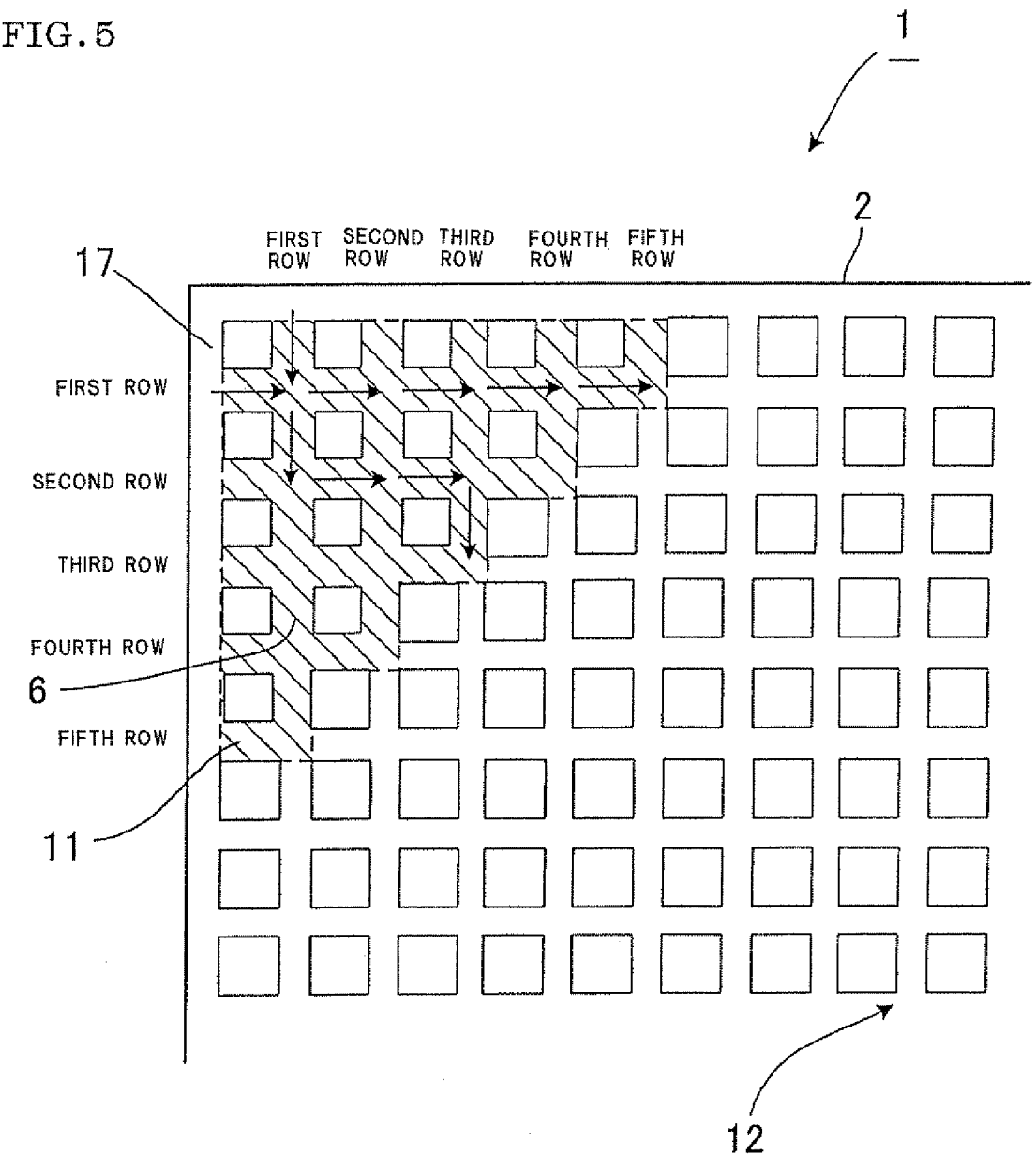
FIG. 5 is a partially enlarged plan view on the forming portion side in one embodiment of a honeycomb segment-forming die of the present invention.

Incidentally, a "corner portion" in the present invention means a region of the forming portion where at least one row of slits including a vertex in the polygonal forming portion of a honeycomb segment-forming die. In a honeycomb segment-forming die of the present embodiment, as shown in FIG. 5, it is preferable that the corner portion 11 is constituted of a region where slits 6 corresponding with one to five rows with the slit on the vertex side of the polygonal forming portion 2 as a starting point. Incidentally, "slits corresponding with one to five rows" means that, as shown in FIG. 5, the total number of vertical and horizontal row (s) of the lattice slits is one to 5. For example, in FIG. 5, the corner portion 11 is constituted of a region (shaded area in FIG. 5) where slits corresponding with five rows are formed. However, the corner portion may be constituted of a region where slits corresponding with one row, two rows, or the like. Here, FIG. 5 is a partially enlarged plan view on the forming portion side in one embodiment of a honeycomb segment-forming die of the present invention.

In addition, in a honeycomb segment-forming die of the present embodiment, the gap L1 of the slits 6 formed in the corner portion 11 of the forming portion 2 is preferably 1.03 to 1.20 times, more preferably 1.05 to 1.12 times, and particularly preferably 1.06 to 1.09 times larger than the gap L2 of slits 6 formed in the central portion 12.

When the gap L1 of the slits 6 formed in the corner portions 11 of the forming portion 2 is less than 1.03 times larger than the gap L2 of the slits 6 forming in the central portion 12 of the forming portion 2, the difference in gap of the slits 6 is too small, and therefore the compressive strength of the honeycomb segment may not be improved sufficiently. On the other hand, when the gap L1 is above 1.20 times larger than the gap L2, it may be impossible to suppress generation of chipping, cracking, or the like though the compressive strength of the honeycomb segment can be improved.

Figure 6:
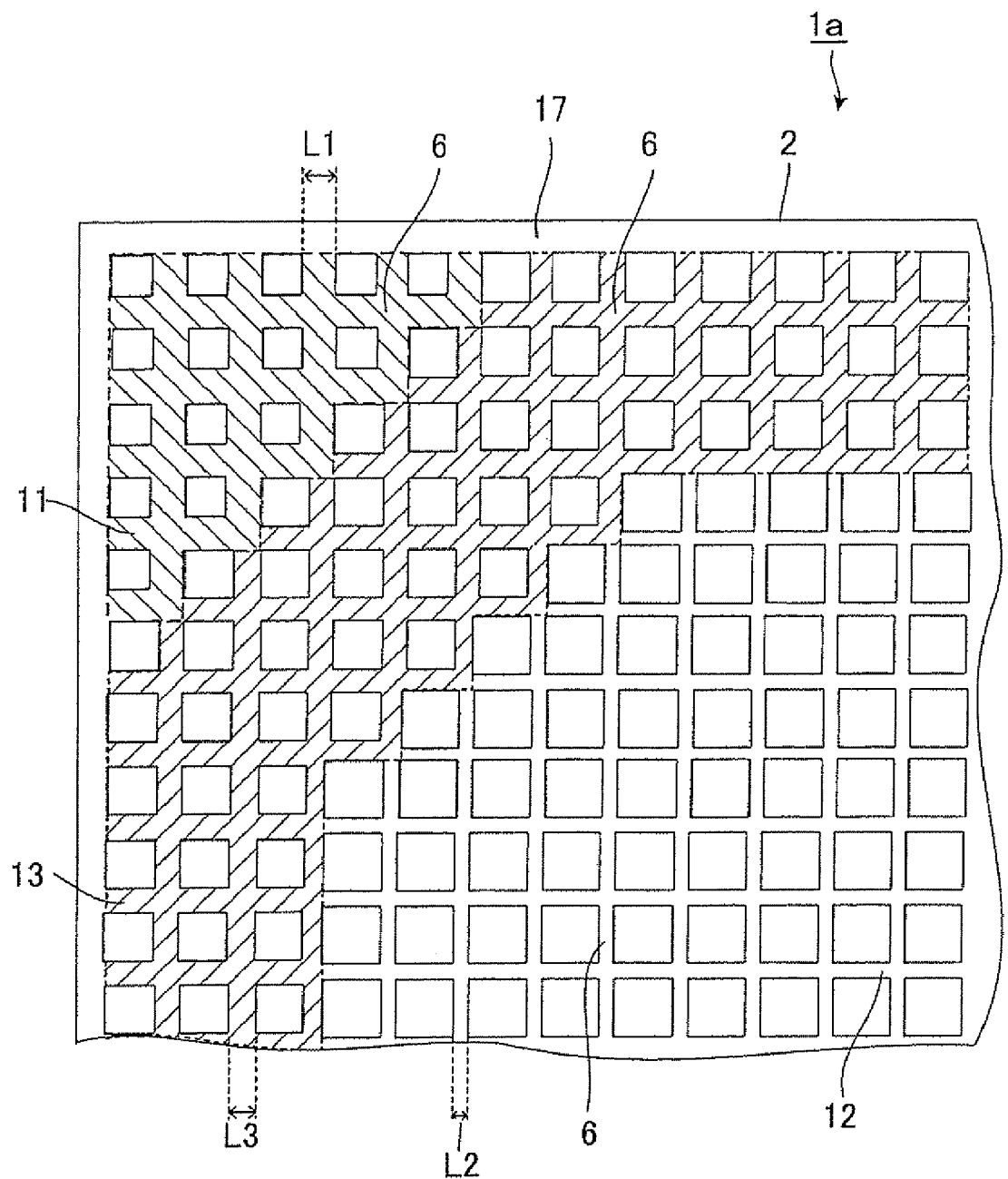
FIG. 6 is a partially enlarged plan view on the forming portion side in another embodiment of a honeycomb segment-forming die of the present invention.

In addition, in a honeycomb segment-forming die of the present embodiment, as shown in FIG. 6, it is preferable that the gap L3 of the slits formed in an outer peripheral portion 13 of the forming portion 2 except for the corner portions 11 is larger than the gap L2 of the slits 6 formed in the central portion 12 of the forming portion 2 and smaller than the gap L1 of the slits 6 formed in the corner portions 11.

While the explanation has been hitherto made on the high flow resistance of the corner portions of a honeycomb segment-forming die, the flow of the kneaded clay for forming is difficult because the flow passage resistance of the outer peripheral portion of the forming portion except for the corner portions is also high, even though not so high like the corner portion. Therefore, for example, as shown in FIG. 6, the gap L1 of the slits 6 in the corner portion 11 may be made the largest with the gap L3 of the slits 6 in the outer peripheral portion 13 of the forming portion 2 except for the corner portions 11 being made larger than the gap L2 of the slits 2 in the central portion 12 (except for the outer peripheral portion 13) and smaller than the gap L1 of the slits 6 in the corner portion 11. Such a constitution enables to increase an introducing amount of kneaded clay for forming into the slits 6 in the outer peripheral portion 13, where flow of kneaded clay for forming is harder than in the central portion 12, to be able to form a honeycomb segment having high compressive strength and hardly having chipping, cracking, or the like. This can increase an introducing amount of kneaded clay for forming in portions where the partition walls tend to be thin, and thickness of the partition walls of the resultant honeycomb segment can be made more uniform.

Incidentally, the honeycomb segment-forming die 1a shown in FIG. 6 is an example where three kinds of slits 6 having different gaps in three points of the corner portion 11, the outer peripheral portion 13, and the central portion 12. However, for example, four or more kinds of slits having different gap may be formed from the corner portion to the central portion by making the gap of the slits in the outer peripheral portion different. In the case that the die is thus constituted, the die is constituted in such a manner that the gap of the slits formed in the corner portions is the largest, and the gap decreases as the slits approach the center of the forming portion.

A honeycomb segment-forming die 1 of the present embodiment as shown in FIGS. 1 to 3 may be a die where the forming portion 2 and the introducing portion 3 are unitarily formed or a die where the forming portion 2 and the introducing portion 3 are formed of different members (they may be two members of the same kind) which are bonded with a bonding material.

A honeycomb segment-forming die 1 is a plate-shaped die having an introduction face 8 and a forming face 4, and the outer peripheral shape of the forming portion is a polygon (the honeycomb segment-forming die 1 shown in FIG. 1 is quadrangular) to be able to form a plasmatic honeycomb segment by the die. Besides, the peripheral shape of the forming portion may be, for example, pentagonal or hexagonal according to the shape of the honeycomb segment to be formed. For example, in the case that the outer peripheral shape of the forming portion is pentagonal or hexagonal, in each corner portion including each vertex of the forming portion, for example, in the six corner portions in the case of a hexagon, the gap of slits is constituted to be larger than the gap of the slits in the central portion.

The size of a honeycomb segment-forming die 1 is not particularly limited and can suitably be determined in accordance with the size of the honeycomb segment to be formed. For example, as the size of the forming portion of a honeycomb segment-forming die, the outer peripheral shape may be a square having a size of 36 mm and a thickness of 20 mm.

The thickness of the forming portion 2 constituting the honeycomb segment-forming die 1 (i.e., the length in the flow direction of kneaded clay for forming) is not particularly limited. However, it is preferably 2 to 5 mm from the viewpoint of moldability and the like upon forming a honeycomb segment.

Incidentally, since the gap L1 of the slits 6 formed in the corner portions 11 is made large for the purpose of increasing the introducing amount of kneaded clay for forming into the slits 6 formed in the corner portions 11 in a honeycomb segment-forming die 1 of the present embodiment, it is preferable that the gap L1 of the slits 6 is made large (wide) not only in the forming face 4 of the forming portion 2 but also in all the region in the thickness direction of the forming portion 2.

Examples of the material for the forming portion 2 include stainless steel, tool steel, and a superhard alloy.

The slits 6 formed in the forming portion 2 is preferably formed in a lattice pattern, and the lattice shape is preferably a rectangle, a hexagon, other polygons, or the like. The width of the slits 6 and the distance between adjacent slits 6 are not particularly limited and can suitably be determined in accordance with the partition wall thickness and cell size of the honeycomb segment to be formed. For example, the width of the slits 6 in the central portion 12 of the forming portion 2 is preferably about 0.29 to 0.32 mm, and the distance between adjacent slits 6 in the central portion 12 of the forming portion 2 is preferably about 1.22 to 1.25 mm. Incidentally, the width of the slits 6 in the central portion 12 of the forming portion 2 and the distance between adjacent slits 6 can be determined on the basis of the target partition wall thickness and cell shape of the honeycomb segment to be formed.

Figure 7:
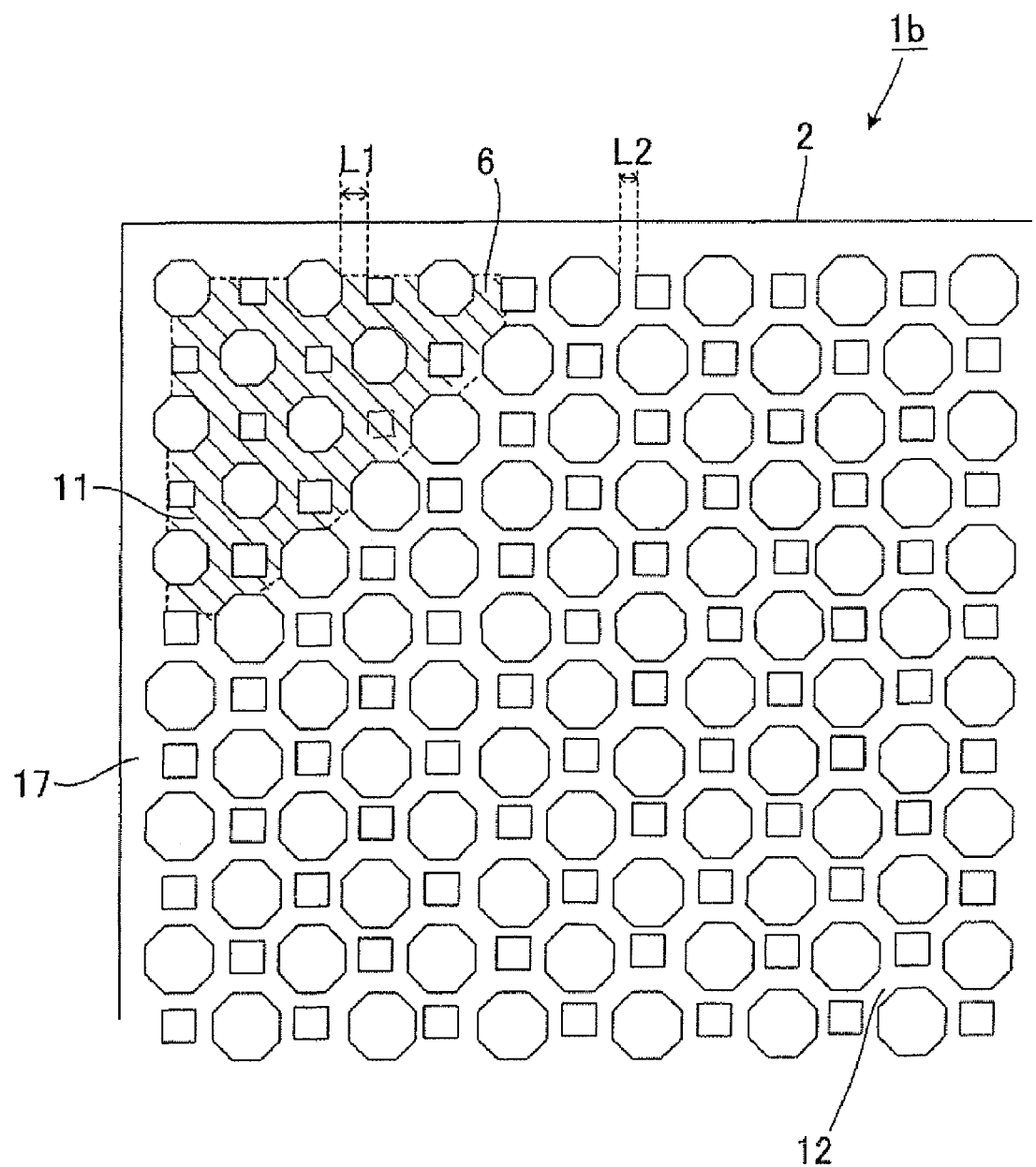
FIG. 7 is a partially enlarged plan view on the forming portion side in still another embodiment of a honeycomb segment-forming die of the present invention.

The shape of the disposition region of the slits 6 in the surface (forming face 4) of the forming portion 2 is not particularly limited and can suitably be determined in accordance with the cell shape of the honeycomb segment to be formed. Examples of the shape include, besides a quadrangle as shown in FIG. 1, a hexagon, an octagon, and other polygons. In addition, the honeycomb segment-forming die 1b may be constituted of the octagonal cells and the quadrangular cells disposed alternately as shown in FIG. 7. Here, FIG. 7 is a partially enlarged plan view on the forming portion side in still another embodiment of a honeycomb segment-forming die of the present invention. Incidentally, in FIG. 7, the same reference numerals are given for each of the elements which are the same as the honeycomb segment-forming die shown in FIGS. 1 to 3 to omit the descriptions.

In addition, the thickness of the introducing portion 3 constituting a honeycomb segment-forming die 1 of the present embodiment as shown in FIGS. 1 to 3 is not particularly limited. However, it is preferably 10 to 15 mm from the viewpoint of strength and pressure loss.

Examples of the material for the introducing portion 3 include stainless steel, tool steel, and a superhard alloy.

The shape of a cross section in parallel with the introduction face 8 of the back holes 7 formed in the introducing portion 3 is not particularly limited and can suitably be determined depending on processability, flowability of kneaded clay for forming, and the like. For example, a circle, an ellipse, and a polygon such as a rectangle can be employed.

The arrangement position of the back holes 7 is not particularly limited. However, it is preferable that the back holes 7 are formed so as to communicate with the cross positions of the slits 6 formed in a lattice pattern, and it is more preferable that the back holes 7 are formed in such a manner that the centers of the back holes 7 are disposed in the cross positions of the slits 6. The diameter of the back holes 7 (diameter of cross section in parallel with the introduction face 8) and the distance between adjacent back holes 7 are not particularly limited and can suitably be determined depending of the width and the formation positions of the slits 6. For example, in the case that a cross section of the back holes 7 is a circle, the diameter is preferably about 1.0 to 2.5 mm. In addition, the shape of the disposition region of the back holes 7 formed in the introducing portion 3 is not particularly limited. However, it is preferably similar to the shape of the disposition region of the slits 6.

[1-1] Method for Manufacturing Honeycomb Segment-Forming Die:

Next, a method for manufacturing a honeycomb segment-forming die of the present embodiment will be described. In manufacturing a honeycomb segment-forming die of the present embodiment, in the first place, a plate-shaped member for the forming portion and the introducing portion of the die is prepared. As the plate-shaped member, it is preferable to employ calcined bodies of a superhard alloy from the viewpoint of, for example, processability in manufacturing. Hereinbelow, a manufacturing method in the case that a plate-shaped member of a superhard alloy calcined body is used will be described.

The back holes are formed on one face side of the plate-shaped member prepared above in the portion corresponding with the introducing portion. For the back holes, there may be employed a method similar to the method for manufacturing a conventional honeycomb segment-forming die or a honeycomb structure-forming die for forming a honeycomb structure. For example, the back holes can be formed by drilling or the like. Incidentally, when a superhard alloy after the main sintering is used for the plate-shaped member, the aforementioned formation of the back holes may be difficult.

Next, the plate-shaped member having the back holes formed therein is fired to obtain a sintered body of a superhard alloy. This improves hardness of the plate-shaped member for a die to give a material excellent in abrasion resistance.

Next, the slits are formed on the other face side of the plate-shaped member subjected to the main firing, that is, in the portion corresponding with the forming portion. For the slit, also, there maybe employed a method similar to the method for manufacturing a conventional honeycomb segment-forming die or the like. For example, the slits can be formed by a slicer, electro-discharge machining (EDM), or the like.

The shape, size, and the like of the slits and the back holes are preferably the same as the shape, size, and the like of the slits and the back holes in one embodiment of the aforementioned honeycomb structure-forming die of the present invention. When a honeycomb segment-forming die of the present embodiment is manufactured, the slits are formed in such a manner that the gap of the slits in each corner portion including each vertex of the polygonal forming portion is larger than the gap of the slits in the central portion of the forming portion. In addition, for example, as shown in FIG. 6, the slits 6 may be formed in such a manner that the slits 6 have different gaps (gap L1>gap L3 >gap L2) among the central portion 12, the outer peripheral portion 13, and the corner portions 11.

As described above, a honeycomb segment-forming die of the present embodiment can be manufactured. Incidentally, as a plate-shaped member for manufacturing a die, there may be employed a bonded body where the first plate-shaped member to function as the forming portion and the second plate-shaped member to function as the introducing portion.

[2] Method for Manufacturing Honeycomb Structure:

Next, one embodiment of a method for manufacturing a honeycomb structure of the present invention will specifically be described. The method for manufacturing a honeycomb structure of the present embodiment is a method using a honeycomb segment-forming die of the present invention described above and including: a step of obtaining a prismatic honeycomb segment formed body by introducing kneaded clay for forming from the back holes of the introducing portion of the honeycomb segment-forming die and extrusion-forming the kneaded clay for forming introduced above through the slits of the forming portion, a step of obtaining a honeycomb segment 50 with porous partition walls 52 separating and forming a plurality of cells 53 functioning as fluid passages and a porous outer wall 57 disposed in the outer periphery of the partition walls 52 as shown in FIG. 4 by drying and firing the honeycomb segment formed body, and a step of manufacturing a honeycomb structure 61 by unitarily joining a plurality of honeycomb segments 50 by bonding the outer walls 57 of the honeycomb segments 50 with a bonding material as shown in FIG. 8.

Here, FIG. 8 is a perspective view showing an example of a honeycomb structure manufactured by a method for manufacturing a honeycomb structure of the present invention. In the honeycomb structure 61 shown in FIG. 8, a plurality of honeycomb segments 50 are unitarily bonded at the bonding faces via the bonding material layer 59 of the bonding material described above. As described above, the honeycomb segment 50 is provided with the porous partition walls 52 separating and forming a plurality of cells 53 functioning as fluid passages and the porous outer walls 57 disposed in the outer periphery of the partition walls 52.

In a method for manufacturing a honeycomb structure of the present embodiment, a honeycomb structure may be manufactured by grinding the honeycomb structure in such a manner that the whole cross-section cut along a plane perpendicular to the central axis of the honeycomb structure 61 has a shape of a circle, an ellipse, a triangle, a square, or another shape (circle in FIG. 8), followed by applying a coating material 55 on the outer peripheral face.

In a method for manufacturing a honeycomb structure of the present embodiment, as a die for forming a honeycomb segment (honeycomb segment formed body), there is used a honeycomb segment-forming die 1 where the gap L1 of the slits 6 formed in the corner portions 11 including each vertex of the polygonal forming portion 2 is larger than the gap L2 of the slits 6 formed in the central portion 12 of the forming portion 2 as shown in FIGS. 1 to 3. Therefore, the thickness of the partition walls 52a (see FIG. 4) extrusion-formed in the corner portions 11, where the flow passage resistance is high to make kneaded clay for forming hardly flow, is equivalent to or larger than the thickness of the partition walls 52b (see FIG. 4) extrusion-formed in the central portion 12, and thereby a honeycomb segment 50 (see FIG. 4) having high mechanical strength, particularly, high compressive strength, and hardly having chipping or cracking can be formed. This enables to improve mechanical strength of the whole honeycomb structure and makes handling of a honeycomb segment easy, which can improve production yield.

The method for manufacturing a honeycomb structure of the present embodiment is not particularly limited and particularly suitable as a method for manufacturing a honeycomb structure of a porous structure of, for example, a silicon-silicon carbide sintered body (Si—SiC sintered body) employing silicon carbide and metal silicon as the main components. Such a honeycomb structure is excellent in thermal shock resistance and can suitably be used as a trapping filter for exhaust gas, particularly, as a diesel particulate filter (DPF) for trapping particulate matter (particulates) or the like of exhaust gas from a diesel engine.

Hereinbelow, the method for manufacturing a honeycomb structure of the present embodiment will be described more specifically by each step.

[2-1] Forming Step of Honeycomb Segment Formed Body:

In the method for manufacturing a honeycomb structure of the present invention, in the first place, a predetermined forming raw material is kneaded to prepare kneaded clay for forming. Suitable examples of the forming raw material include one kind selected from the group consisting of cordierite, alumina, mullite, lithium aluminum silicate, aluminum titanate, titanic, zirconia, silicon nitride, aluminum nitride, silicon carbide, and LAS (lithium aluminum silicate); a composite thereof; stainless steel; aluminum alloy; or one of adsorbing materials of activated carbon, silica gel, and zeolite from the viewpoint of strength, thermal resistance, and the like.

In particular, in the method for manufacturing a honeycomb structure of the present embodiment exhibits a large effect when silicon carbide or a silicon-silicon carbide composite phase is used as the main component of the forming raw material. When the extrusion forming is conducted using a conventional honeycomb segment forming-die, where all the gaps of the slits are uniform, such a forming raw material had a problem of extremely thin partition wall extruded from the corner portions due to extremely high flow passage resistance in the corner portions.

Since the method for manufacturing a honeycomb structure of the present embodiment employs a die where the gap between the slits in the corner portions is made relatively large, the thickness of the partition walls in the corner portion, where the partition walls has conventionally been extremely thin, can be made thick to form a honeycomb segment having high mechanical strength, particularly, high compressive strength and hardly having chipping, cracking, or the like.

When the kneaded clay for forming is prepared, about 10 to 40 parts by mass of water is put with respect to 100 parts by mass of a mixed raw material powder of the aforementioned forming raw material and additives added thereto as necessary, followed by kneading to obtain a mixture having plasticity. The aforementioned additives are additives added to a forming raw material when a conventionally known honeycomb structure is manufactured, for example, a binder such as methyl cellulose and hydroxypropoxylmethyl cellulose, an organic pore former, and a surfactant.

Next, thus obtained kneaded clay for forming is introduced from the back holes 7 of the introducing portion 3 of a honeycomb segment-forming die 1 of the present invention as shown in FIGS. 1 to 3, and the introduced kneaded clay for forming is formed by extruding from the slits 6 of the forming portion 2 to obtain a prismatic honeycomb segment formed body.

Incidentally, extrusion-forming may be conducted in any direction of a lateral (horizontal) direction, a vertical (perpendicular) direction, an oblique direction. Such extrusion-forming can be realized by the use of a vacuum kneader, a ram extruder, or the like.

[2-2] Forming Step of Honeycomb Segment:

Next, the resultant honeycomb segment formed body was dried and fired to obtain a honeycomb segment 50 provide with porous partition walls 52 separating and forming a plurality of cells 53 functioning as fluid passages and a porous outer wall 57 disposed in the outer periphery of the partition walls 52 as shown in FIG. 4.

Though drying the honeycomb segment formed body can be conducted by various kinds of methods, it is preferable to dry the honeycomb segment formed body by a method of a combination of microwave drying and hot air drying or a combination of dielectric drying and hot air drying. As other methods, a special drying, for example, freeze drying, reduced pressure dying, vacuum drying, and far-infrared drying may be employed.

Incidentally, after the honeycomb segment formed body is thus dried, both the end faces of the honeycomb segment formed body may be cut so that the honeycomb segment may have a predetermined length.

The firing furnace for firing the dried honeycomb segment formed body and the firing conditions can suitably be selected in accordance with the shape, material, and the like of the honeycomb segment formed body. Organic matter such as a binder may be combusted and removed by calcination before the firing.

In addition, after the honeycomb segment formed body is dried and fired, plugging may be arranged in a predetermined pattern in the opening portions of cells in the end faces of the honeycomb segment formed body. The plugging may be conducted by a known method. Upon plugging, it is general to plug in such a manner that each of the end faces shows a checkerwise pattern. However, there may be employed a pattern where plugged cells are assembled, while unplugged cells are assembled, too, or a pattern of rows, concentric circles, or the like. Such plugging may be conducted after the honeycomb segments are unitarily joined.

[2-3] Manufacturing Step of Honeycomb Structure:

Next, thus obtained honeycomb segments are unitarily bonded with a bonding material at the outer walls to manufacture a honeycomb structure.

As the bonding material, there may be used a bonding material used when the outer walls of a plurality of honeycomb segments are bonded in a conventionally known method for manufacturing a honeycomb structure. An example of the bonding materials contains inorganic particles and an inorganic adhesive as the main components and an organic binder, a surfactant, a resin balloon, water, and the like as accessory components.

Examples of the inorganic particles include plate-shaped particles, spherical particles, aggregated particles, fibrous particles, and acicular particles. Examples of the inorganic adhesive include colloidal silica ($SiO_2$ sol), colloidal alumina (alumina sol), various kinds of oxide sol, ethyl silicate, liquid glass, silica polymer, and aluminum phosphate. As the main component of the bonding material, there is suitably employed a component containing a ceramic powder having the same components as the components constituting the honeycomb segment. Examples of the plate-shaped component include mica, talc, boron nitride, and glass flake.

Such a bonding material is applied on the outer wall of the honeycomb segments to bond the honeycomb segments. The bonding material may be applied on both the outer walls of the honeycomb segments to be bonded together or may be applied on only one outer wall of one of the honeycomb segments.

The thickness of the bonding material to be applied is not particularly limited and suitably be determined in consideration of bonding force between the honeycomb segments. For example, the thickness of the bonding material applied is preferably 0.5 to 3.0 mm.

A plurality of honeycomb segments are combined by such a bonding material and compressed in the combined state, followed by heat-dried to obtain a bonded body where a plurality of honeycomb segments are unitarily bonded. Then, the bonded body is subjected to grinding in such a manner that the shape of the whole cross-section cut along a plane perpendicular to the central axis becomes a predetermined shape such as a circle, and the outer peripheral face is covered with a coating material, followed by heat-drying.

A honeycomb structure 61 as shown in FIG. 8 can be manufactured in such a manner described above. As the material for the coating material 55, a material similar to the bonding material can be used. The thickness of the coating material is not particularly limited and suitably be selected within the range of, for example, 0.1 to 1.5 mm.

EXAMPLE

Hereinbelow, the present invention will specifically be described on the basis of Examples. However, the present invention is by no means limited to these Examples.

Example 1

A honeycomb segment was manufactured by the use of a honeycomb segment-forming die provided with an introducing portion arranged on one face (introduction face) side and having a plurality of back holes and a forming portion arranged on the other face (forming face) side and having the slits communicating with the back holes and a polygonal outer peripheral shape, where the gap of the slits (slit width) corresponding to five rows with the slit on the vertex side of the polygonal forming portion as the starting point is 0.31 mm and where the gap of the slits (slit width) in the other portion (central portion) is 0.3 mm.

(Manufacture of Honeycomb Segment)

As honeycomb segment raw materials, 80 parts by mass of a SiC powder and 20 parts by mass of a metal Si powder were mixed together, starch and a resin balloon were added to the mixture as pore formers, and methyl cellulose, hydroxypropoxyl methyl cellulose, a surfactant, and water were further added to the mixture to prepare kneaded clay (kneaded clay for forming) having plasticity. The kneaded clay was extrusion-formed using the aforementioned honeycomb segment-forming die, followed by drying by microwaves and hot air to obtain a honeycomb segment formed body having a cell density of about 46.5 cells/cm$^2$ (300 cells/inch$^2$), a square cross section of a side of 35 mm, and a length of 152 mm. Plugging was conducted in such a manner that each end face of the honeycomb segment formed body has a checkerwise pattern. That is, plugging was performed in such a manner that adjacent cells are plugged in the mutually opposite end portions. As the plugging material, a material similar to the above honeycomb segment raw materials was used.

As described above, predetermined cells on both the end faces of the honeycomb segment formed body was plugged, and the honeycomb segment formed body was dried and then degreased at about 400° C. in an ambient atmosphere, followed by firing at about 1450° C. in an Ar inert atmosphere to obtain a porous-structured honeycomb segment where SiC crystalline particles were bonded by Si.

The resultant honeycomb segment was measured for A axis compressive strength and B axis compressive strength by the following method. In addition, chipping percent defective in the manufacturing step of the honeycomb segment was calculated. The results are shown in Table 1.

[Compressive Strength Test (A Axis Compressive Strength, B Axis Compressive Strength]: According to JASO standard M505-87, A axis compressive strength and B axis compressive strength of the honeycomb segment were measured. The A axis compressive strength is a value obtained by measuring compressive strength in a passage direction (A axis) of the cells 53 of the honeycomb segment 50 as shown in FIG. 4, and the B axis compressive strength is a value obtained by measuring compressive strength in a direction (B axis) perpendicular to the A axis and the wall faces of the cells 53.

[Chipping Percentage Defective (%)]: Upon manufacturing the honeycomb segment by the aforementioned method, chipping of corner portions in the four corners of the end faces of each honeycomb segment was visually inspected. The chipping percentage defective (%) shows a percentage (%) of the honeycomb segments having chipping in a corner portion inspected by the above visual observation by manufacturing 1000 honeycomb segments. Incidentally, the aforementioned "corner portion in the four corners of the end faces of each honeycomb segment" means a triangular pyramid with, as the bottom face, the triangle formed by connecting one point at a distance 1.5 mm in the A axial direction from the vertex in the end face of the honeycomb segment and two points at a distance for one cell from the vertex in the outer periphery of the end face.

TABLE 1

|  | Number of rows constituting corner portion | Slit width in central portion (mm) | Slit width in corner portion (mm) | Ratio of slit width (corner portion/ central portion) | A axis compressive strength (Mpa) | B axis compressive strength (Mpa) | Chipping percentage defective |
|---|---|---|---|---|---|---|---|
| Example 1 | 5 | 0.3 | 0.31 | 1.033 | 2.75 | 0.78 | 1.2 |
| Example 2 | 5 | 0.3 | 0.315 | 1.050 | 2.85 | 0.81 | 1.2 |
| Example 3 | 5 | 0.3 | 0.32 | 1.067 | 2.89 | 0.82 | 1.1 |
| Example 4 | 5 | 0.3 | 0.325 | 1.083 | 2.97 | 0.85 | 1.0 |
| Example 5 | 5 | 0.3 | 0.33 | 1.100 | 2.99 | 0.87 | 0.8 |
| Example 6 | 5 | 0.3 | 0.335 | 1.117 | 3.05 | 0.92 | 0.8 |
| Example 7 | 5 | 0.3 | 0.345 | 1.150 | 3.11 | 0.95 | 0.6 |
| Example 8 | 5 | 0.3 | 0.35 | 1.167 | 3.18 | 1.01 | 0.4 |
| Example 9 | 5 | 0.3 | 0.355 | 1.183 | 3.19 | 1.01 | 0.4 |
| Example 10 | 5 | 0.3 | 0.36 | 1.200 | 3.23 | 1.03 | 0.2 |
| Example 11 | 1 | 0.3 | 0.31 | 1.033 | 2.6 | 0.74 | 1.3 |
| Example 12 | 2 | 0.3 | 0.31 | 1.033 | 2.65 | 0.74 | 1.3 |
| Example 13 | 3 | 0.3 | 0.31 | 1.033 | 2.69 | 0.75 | 1.2 |
| Example 14 | 4 | 0.3 | 0.31 | 1.033 | 2.74 | 0.78 | 1.2 |
| Example 15 | 1 | 0.3 | 0.305 | 1.017 | 2.51 | 0.75 | 1.5 |
| Example 16 | 5 | 0.3 | 0.365 | 1.217 | 3.25 | 1.05 | 0.2 |
| Example 17 | 6 | 0.3 | 0.31 | 1.033 | 2.95 | 0.98 | 0.3 |
| Comp. Ex. 1 | 0 | 0.3 | 0.3 | 1.000 | 2.50 | 0.72 | 1.5 |

Examples 2 to 17

Honeycomb segments were manufactured in the same manner as in Example 1 except that forming was conducted by the use of honeycomb segment-forming dies where the gaps of the slits (slit width) in the corner portions were constituted as shown in Table 1. Each of the honeycomb segments was measured for A axis compressive strength and B axis compressive strength by the aforementioned method. In addition, the chipping percentage defective in the manufacturing step of the honeycomb segments was calculated. The results are shown in Table 1.

Comparative Example 1

Figure 10:
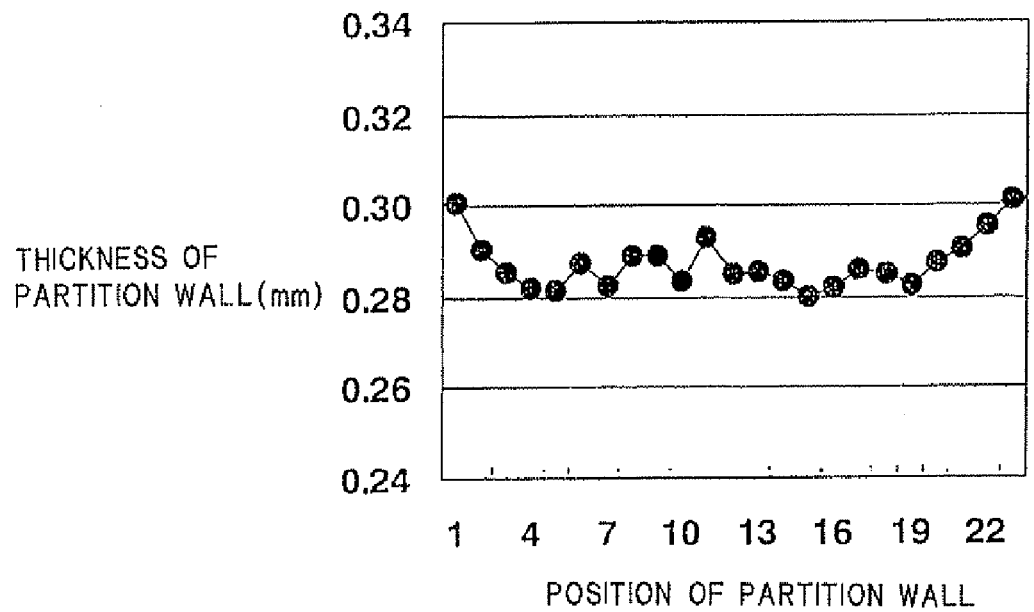
FIG. 10 is a graph showing a relation between a position of a partition wall and thickness of the partition wall in the B-axial direction of a honeycomb segment manufactured in Example 5.
Figure 11:
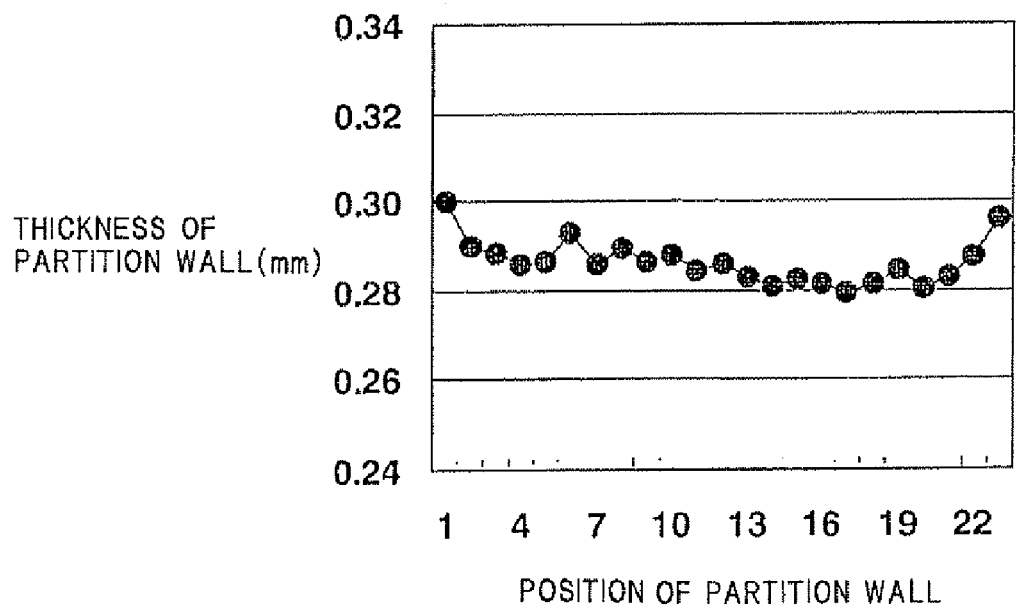
FIG. 11 is a graph showing a relation between a position of a partition wall and thickness of the partition wall in the B-axial direction of a honeycomb segment manufactured in Example 5.
Figure 12:
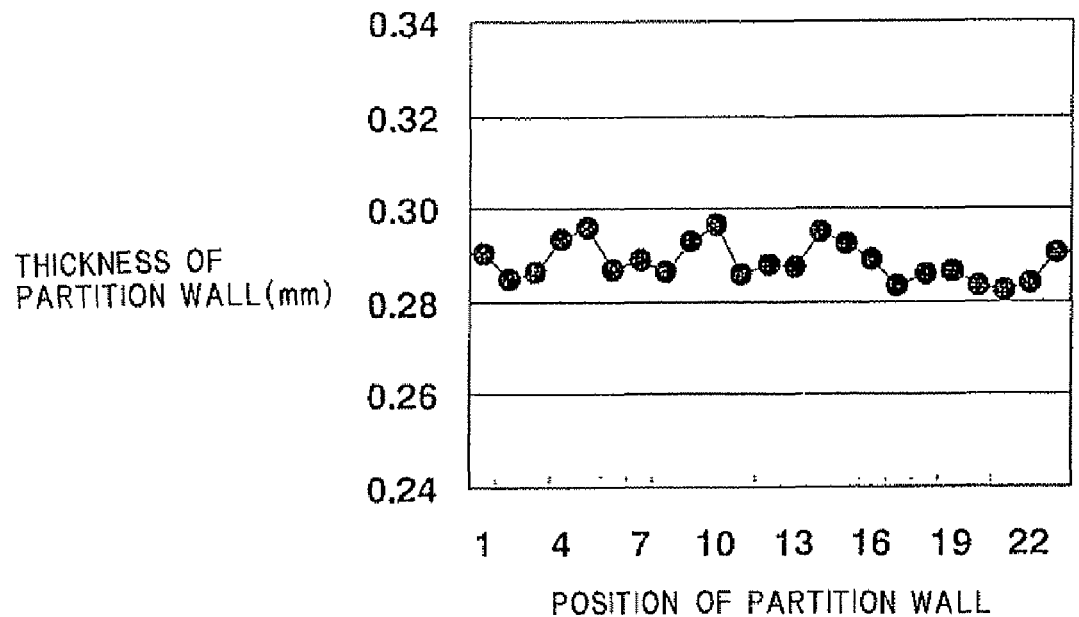
FIG. 12 is a graph showing a relation between a position of a partition wall and thickness of the partition wall in the B-axial direction of a honeycomb segment manufactured in Example 5.
Figure 13:
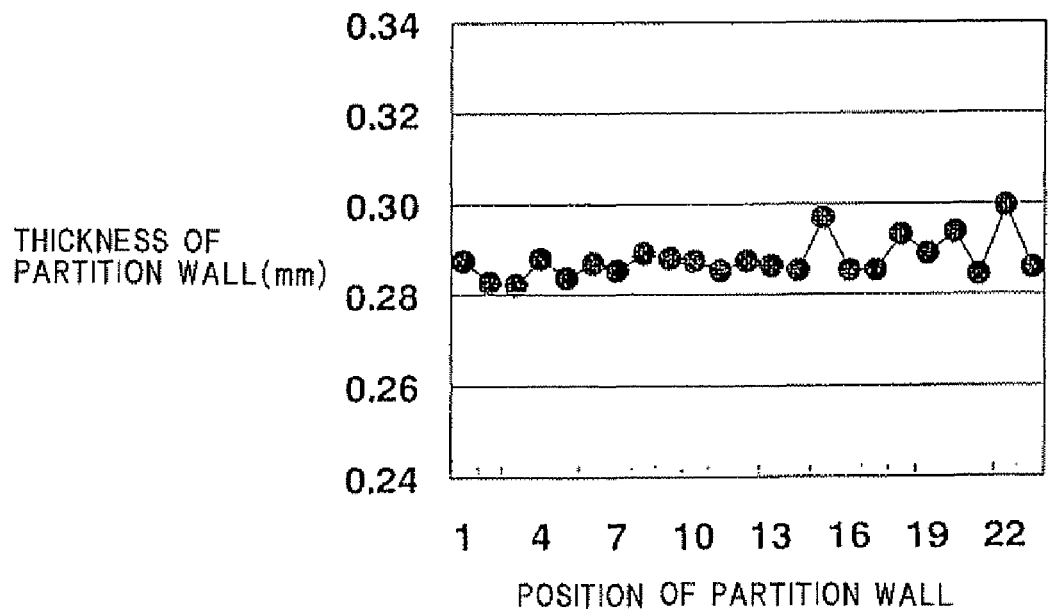
FIG. 13 is a graph showing a relation between a position of a partition wall and thickness of the partition wall in the B-axial direction of a honeycomb segment manufactured in Example 5.

Honeycomb segments were manufactured in the same manner as in Example 1 except that forming was conducted by the use of a honeycomb segment-forming die having 0.3 mm of the gap (slit width) of all the slits of the forming portion, that is, a die having no difference in slit width between the corner portions and the central portion. Each of the honeycomb segments was measured for A axis compressive strength and B axis compressive strength by the aforementioned method. In addition, the chipping percentage defective in the manufacturing step of the honeycomb segments was calculated. The results are shown in Table 1.

between a position of a partition wall and thickness of the partition wall in the B-axial direction of a honeycomb segment manufactured in Example 5. In FIGS. 9 to 13, the axis of abscissa shows the position of the partition walls (23 partition walls) for one row, and the axis of ordinate shows the thickness (mm) of the partition walls. Incidentally, FIG. 9 is a graph of the row on the outermost peripheral side (first row), and FIG. 10 is a graph of the row (second row) adjacent to the row of the outermost peripheral side (first row). Likewise, FIG. 11 is a graph of the third row, FIG. 12 is a graph of the fourth row, and the FIG. 13 is a graph of the fifth row.

TABLE 2

Example 5

| Position of partition wall | Row on outermost peripheral side Partition wall thickness (mm) | Second row Partition wall thickness (mm) | Third row Partition wall thickness (mm) | Fourth row Partition wall thickness (mm) | Fifth row Partition wall thickness (mm) |
|---|---|---|---|---|---|
| 1 | 0.312 | 0.301 | 0.300 | 0.290 | 0.287 |
| 2 | 0.301 | 0.291 | 0.290 | 0.285 | 0.282 |
| 3 | 0.295 | 0.285 | 0.288 | 0.286 | 0.282 |
| 4 | 0.296 | 0.282 | 0.286 | 0.293 | 0.288 |
| 5 | 0.293 | 0.281 | 0.287 | 0.296 | 0.284 |
| 6 | 0.290 | 0.288 | 0.293 | 0.287 | 0.287 |
| 7 | 0.295 | 0.282 | 0.286 | 0.289 | 0.285 |
| 8 | 0.289 | 0.289 | 0.290 | 0.287 | 0.289 |
| 9 | 0.290 | 0.289 | 0.286 | 0.293 | 0.288 |
| 10 | 0.292 | 0.284 | 0.288 | 0.297 | 0.287 |
| 11 | 0.295 | 0.293 | 0.284 | 0.286 | 0.285 |
| 12 | 0.289 | 0.285 | 0.286 | 0.288 | 0.287 |
| 13 | 0.292 | 0.285 | 0.283 | 0.287 | 0.286 |
| 14 | 0.289 | 0.284 | 0.281 | 0.295 | 0.285 |
| 15 | 0.292 | 0.280 | 0.283 | 0.293 | 0.297 |
| 16 | 0.290 | 0.282 | 0.281 | 0.289 | 0.285 |
| 17 | 0.299 | 0.286 | 0.279 | 0.283 | 0.285 |
| 18 | 0.293 | 0.285 | 0.281 | 0.286 | 0.293 |
| 19 | 0.296 | 0.282 | 0.285 | 0.287 | 0.289 |
| 20 | 0.290 | 0.287 | 0.281 | 0.283 | 0.294 |
| 21 | 0.293 | 0.290 | 0.283 | 0.282 | 0.284 |
| 22 | 0.300 | 0.295 | 0.288 | 0.284 | 0.299 |
| 23 | 0.313 | 0.301 | 0.296 | 0.291 | 0.286 |

(Discussion)

In the honeycomb segments of Examples 1 to 17, there was confirmed improvement in A axis compressive strength and B axis compressive strength in comparison with the honeycomb segments of Comparative Example 1. In Examples 1 to 14, where a honeycomb segment-forming die having one to five rows constituting a corner portion of the forming portion and a ratio of slit width of the corner portions to the central portion (slit width ratio (corner portions/central portion)) of 1.03 to 1.20, reduction in chipping percentage defective was confirmed together with improvement in A axis compressive strength and B axis compressive strength.

Figure 14:
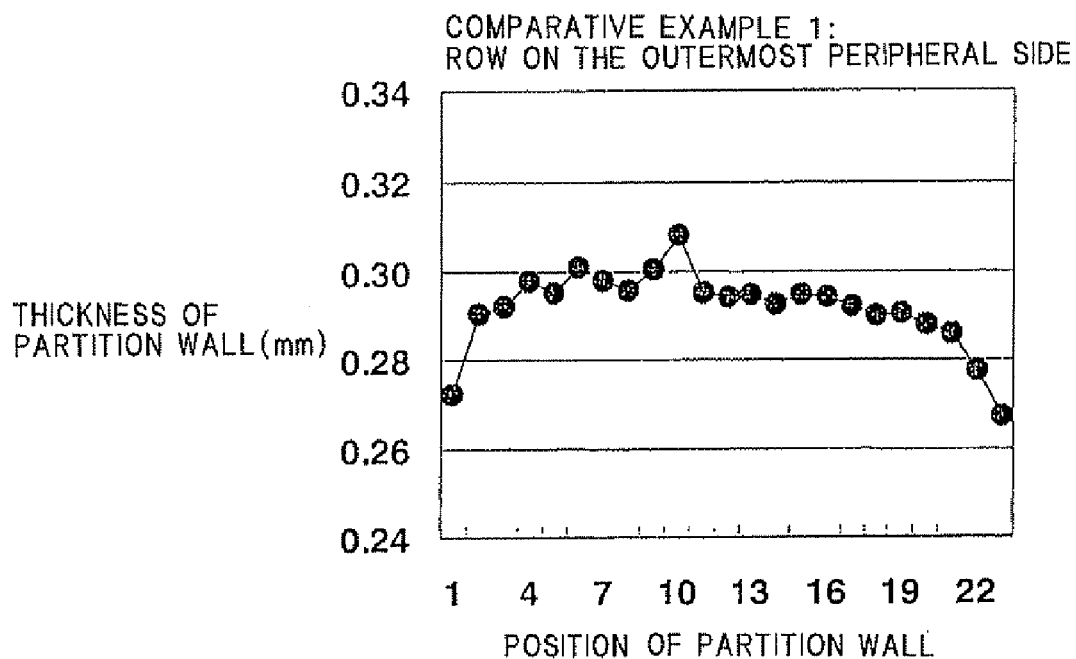
FIG. 14 is a graph showing a relation between a position of a partition wall and thickness of the partition wall in the B--axial direction of a honeycomb segment manufactured in Comparative Example 1.
Figure 15:
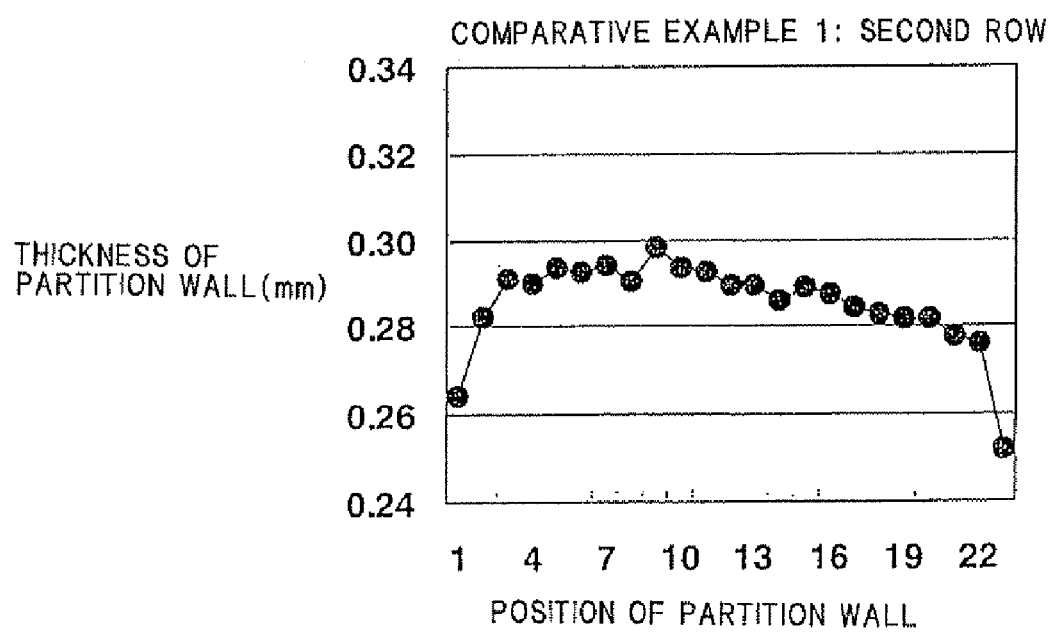
FIG. 15 is a graph showing a relation between a position of a partition wall and thickness of the partition wall in the B-axial direction of a honeycomb segment manufactured in Comparative Example 1.
Figure 16:
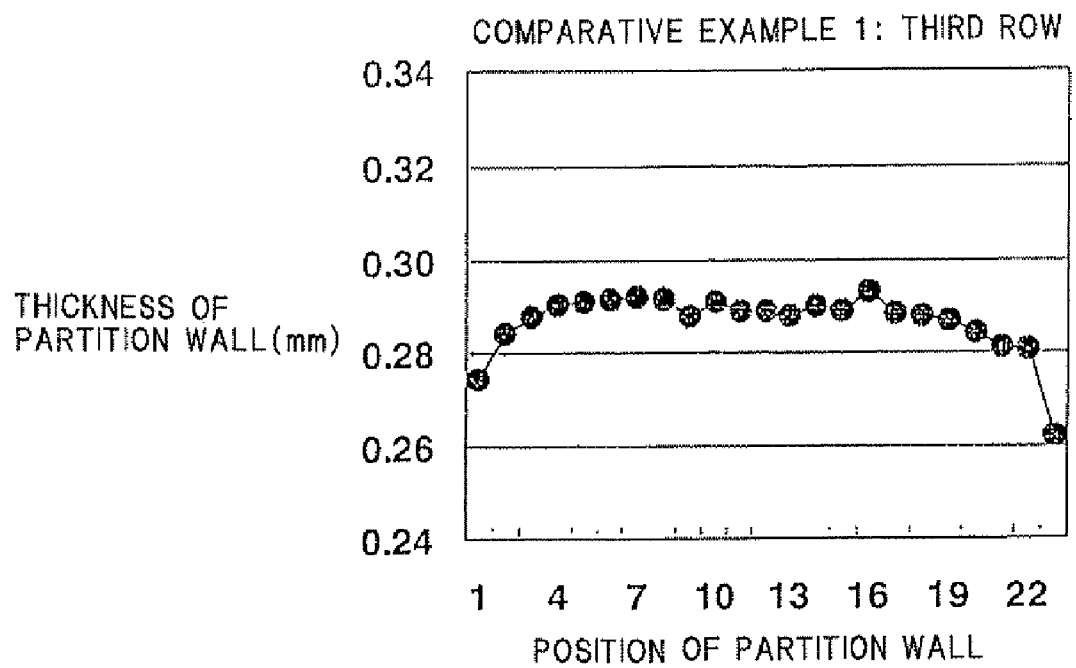
FIG. 16 is a graph showing a relation between a position of a partition wall and thickness of the partition wall in the B-axial direction of a honeycomb segment manufactured in Comparative Example 1.
Figure 17:
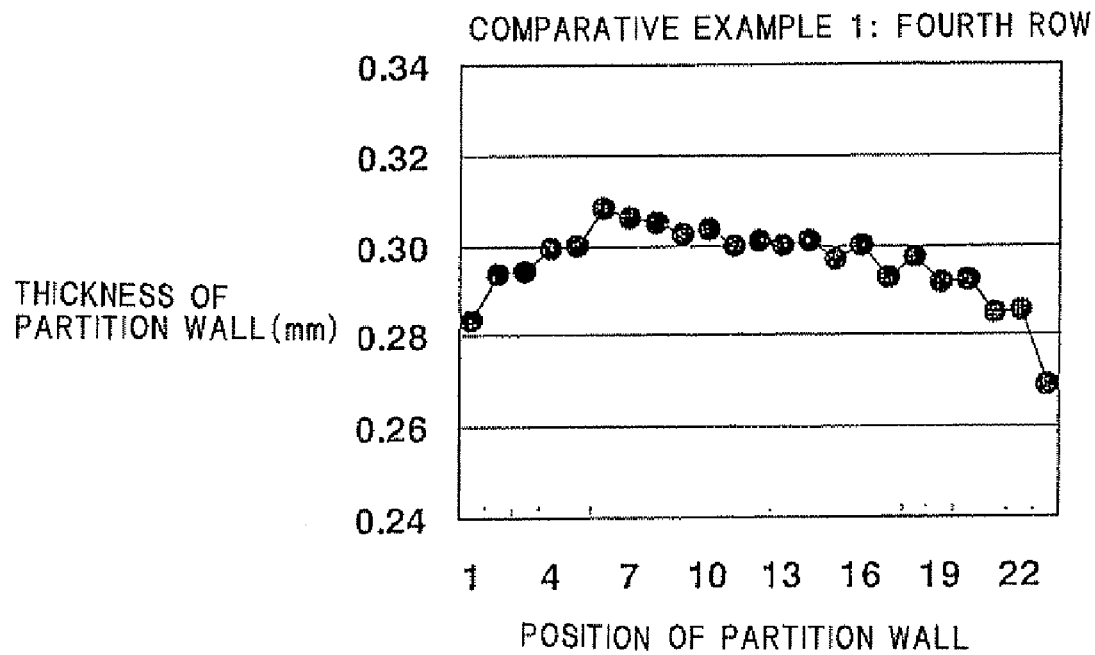
FIG. 17 is a graph showing a relation between a position of a partition wall and thickness of the partition wall in the B-axial direction of a honeycomb segment manufactured in Comparative Example 1.
Figure 18:
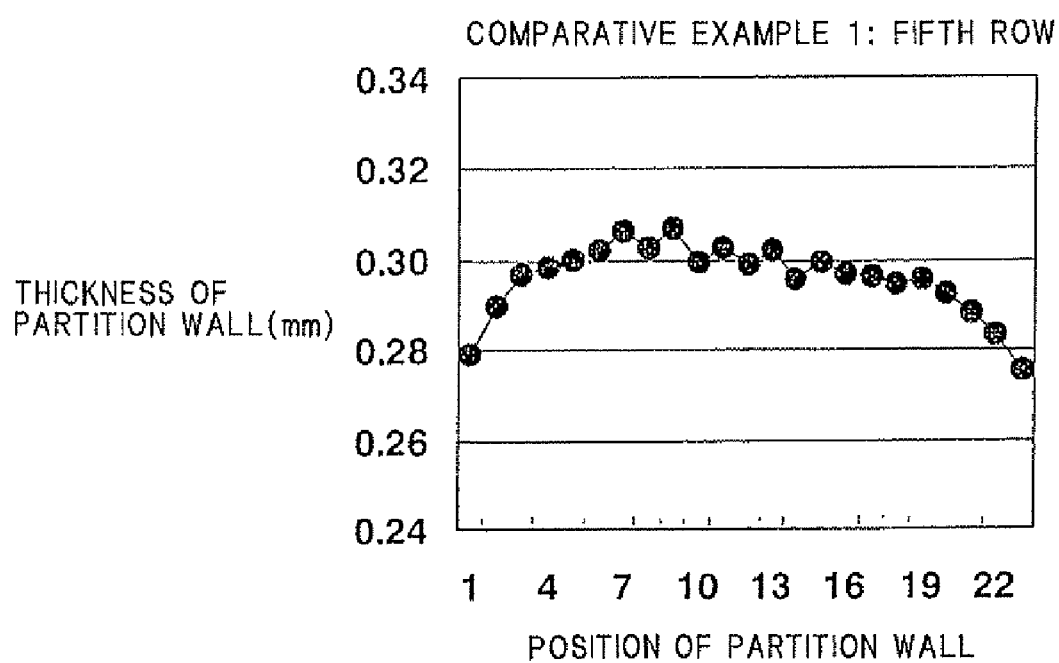
FIG. 18 is a graph showing a relation between a position of a partition wall and thickness of the partition wall in the B-axial direction of a honeycomb segment manufactured in Comparative Example 1.

In addition, in the honeycomb segments manufactured in Example 5, the thickness of each partition wall in B axis direction from the first row to the fifth row on the outermost peripheral side was measured. The results are shown in Table 2. Here, FIGS. 9 to 13 are graphs each showing a relation In addition, the honeycomb segments manufactured in Comparative Example 1, like Example 5, were measured for the thickness of each partition wall in B-axial direction at the first row on the outermost peripheral side to the fifth row. The result is shown in Table 3. In addition, FIGS. 14 to 18 are graphs each showing a relation between a position of a partition wall and thickness of the partition wall in the B-axial direction of a honeycomb segment manufactured in Comparative Example 1. In FIGS. 14 to 18, the axis of abscissa shows the position of the partition walls (23 partition walls) for one row, and the axis of ordinate shows the thickness (mm) of the partition walls. Incidentally, FIG. 14 is a graph of the row on the outermost peripheral side (first row), and FIG. 15 is a graph of the row (second row) adjacent to the row of the outermost peripheral side (first row). Likewise, FIG. 16 is a graph of the third row, FIG. 17 is a graph of the fourth row, and the FIG. 18 is a graph of the fifth row.

TABLE 3

Example 5

| Position of partition wall | Row on outermost peripheral side Partition wall thickness (mm) | Second row Partition wall thickness (mm) | Third row Partition wall thickness (mm) | Fourth row Partition wall thickness (mm) | Fifth row Partition wall thickness (mm) |
|---|---|---|---|---|---|
| 1 | 0.274 | 0.264 | 0.273 | 0.283 | 0.278 |
| 2 | 0.290 | 0.282 | 0.284 | 0.294 | 0.290 |
| 3 | 0.292 | 0.291 | 0.288 | 0.294 | 0.297 |
| 4 | 0.298 | 0.290 | 0.290 | 0.299 | 0.298 |
| 5 | 0.295 | 0.294 | 0.291 | 0.300 | 0.300 |
| 6 | 0.301 | 0.292 | 0.291 | 0.308 | 0.302 |
| 7 | 0.298 | 0.294 | 0.292 | 0.306 | 0.306 |
| 8 | 0.296 | 0.291 | 0.291 | 0.305 | 0.303 |
| 9 | 0.300 | 0.298 | 0.288 | 0.303 | 0.307 |
| 10 | 0.308 | 0.294 | 0.291 | 0.303 | 0.299 |
| 11 | 0.295 | 0.293 | 0.289 | 0.300 | 0.302 |
| 12 | 0.294 | 0.289 | 0.289 | 0.301 | 0.299 |
| 13 | 0.294 | 0.289 | 0.288 | 0.300 | 0.302 |
| 14 | 0.293 | 0.286 | 0.290 | 0.301 | 0.296 |
| 15 | 0.295 | 0.289 | 0.289 | 0.296 | 0.299 |
| 16 | 0.294 | 0.287 | 0.293 | 0.300 | 0.297 |
| 17 | 0.292 | 0.284 | 0.288 | 0.293 | 0.296 |
| 18 | 0.290 | 0.283 | 0.288 | 0.297 | 0.295 |
| 19 | 0.290 | 0.282 | 0.287 | 0.291 | 0.296 |
| 20 | 0.288 | 0.282 | 0.284 | 0.292 | 0.292 |
| 21 | 0.286 | 0.277 | 0.281 | 0.285 | 0.288 |
| 22 | 0.278 | 0.276 | 0.281 | 0.286 | 0.283 |
| 23 | 0.267 | 0.252 | 0.262 | 0.269 | 0.275 |

As shown in FIGS. 9 to 13 and Tables 1 and 2, in the honeycomb segments manufactured in Example 5, the thickness of the partition walls formed in the corner portions could be made equivalent to or larger than the thickness of the partition walls formed in the other portion. On the other hand, as shown in FIGS. 14 to 18 and Table 3, in Comparative Example 1, the partition walls formed in the corner portion became extremely thin.

Industrial Applicability

A honeycomb segment-forming die of the present invention can be used for forming a honeycomb segment for manufacturing a honeycomb structure. In particular, it can suitably be used for manufacturing a honeycomb segment excellent in thermal shock resistance and used for a trapping filter for exhaust gas, particularly, a diesel particulate filter (DPF) for trapping particulate matter (particulates) and the like in exhaust gas.

In addition, a method for manufacturing a honeycomb structure of the present invention can suitably be used as a method for manufacturing the aforementioned honeycomb structure used for a diesel particulate filter.

The invention claimed is:

1. A honeycomb segment-forming die comprising: an introducing portion arranged on an introduction face side and having a plurality of back holes, and a forming portion arranged on a formation face side and having slits communicating with the back holes;
wherein the forming portion has a polygonal outer peripheral shape and forms a prismatic honeycomb segment by passing kneaded clay for forming which is introduced from the back holes of the introducing portion through the slits of the forming portion,
a first width of the slits formed in each of corner portions including a vertex of the polygonal forming portion is larger than a second width of the slits formed in a central portion of the forming portion, and
a third width of the slits formed in an outer peripheral portion of the forming portion that does not include the corner portions is larger than the second width and is smaller than the first width.

2. A honeycomb segment-forming die according to claim 1, wherein the first width is 1.03 to 1.20 times larger than the second width.

3. A honeycomb segment-forming die according to claim 1, wherein each of the corner portions is constituted by a region of one to five rows of the slits with the corner portion beginning at a vertex side of the forming portion.

4. A honeycomb segment-forming die according to claim 2, wherein each of the corner portions is constituted by a region of one to five rows of the slits with the corner portion beginning at a vertex side of the forming portion.

5. A method for manufacturing a honeycomb structure comprising:
obtaining a prismatic honeycomb segment formed body by introducing kneaded clay for forming from a plurality of back holes of an introducing portion of a honeycomb segment-forming die which comprises an introducing portion arranged on an introduction face side and having the plurality of back holes, and a forming portion arranged on a formation face side and having slits communicating with the back holes; wherein the forming portion has a polygonal outer peripheral shape and forms a prismatic honeycomb segment by passing kneaded clay for forming which is introduced from the back holes of the introducing portion through the slits of the forming portion, and wherein a first width of the slits formed in each of corner portions including a vertex of the polygonal forming portion is larger than a second width of the slits formed in a central portion of the forming portion and a third width of the slits formed in an outer peripheral portion of the forming portion that does not include the corner portions is larger than the second width and is smaller than the first width, and extrusion-forming the kneaded clay for forming through the slits of the forming portion, obtaining a honeycomb segment with porous partition walls separating and forming a plurality of cells functioning as fluid passages and a porous outer wall disposed in the outer periphery of the partition walls by drying and firing the honeycomb segment formed body, and manufacturing a honeycomb structure by unitarily joining a plurality of honeycomb segments by bonding the outer walls with a bonding material.

6. A method for manufacturing a honeycomb structure according to claim 5, wherein the honeycomb segment-forming die whose first width of the slits formed in the corner portions of the forming portion is 1.03 to 1.20 times larger than the second width of slits formed in the central portion is used.

7. A method for manufacturing a honeycomb structure according to claim 5, wherein the honeycomb segment-forming die each of whose corner portions is constituted by a region of one to five rows of the slits with the corner portion beginning at a vertex side of the forming portion is used.

* * * * *